United States Patent [19]

Myer

[11] 3,762,819

[45] Oct. 2, 1973

[54] OPTICAL ANGLE MEASURING SYSTEM

[75] Inventor: Jon H. Myer, Woodland Hills, Calif.

[73] Assignee: Hughes Aircraft Company, Culver City, Calif.

[22] Filed: Aug. 12, 1971

[21] Appl. No.: 171,083

[52] U.S. Cl................ 356/138, 356/150, 356/151, 356/152, 356/71, 356/167, 250/219 Q, 250/219 QA, 250/236, 33/1 C, 33/1 N, 33/1 L

[51] Int. Cl........................ G01b 11/26, G01c 1/00

[58] Field of Search..................... 33/1 C, 1 N, 1 L; 356/150, 151, 71, 162, 167, 138, 152; 250/219 Q, 219 QA, 236

[56] References Cited
UNITED STATES PATENTS

| | | | |
|---|---|---|---|
| 3,573,475 | 4/1971 | Nordlund | 250/219 QA |
| 3,457,422 | 7/1969 | Rottmann | 356/167 |
| 2,952,181 | 9/1960 | Maurer, Jr. | 250/219 Q |
| 3,349,325 | 10/1967 | Bajars | 356/152 |

Primary Examiner—Ronald L. Wibert
Assistant Examiner—Paul K. Godwin
Attorney—W. H. MacAllister, Jr. et al.

[57] ABSTRACT

An optical system is disclosed for automatically measuring corner angles of graphic patterns. In a preferred embodiment, the image of a graphic pattern is illuminated by a light source, slowly rotated by a rotating K-mirror assembly and rapidly scanned by a rotating mirror drum which sequentially projects predetermined incremental portions of the graphic pattern through a slit into a light sensor for detection. An angle mark generator is utilized to generate angle marks as the K-mirror assembly rotates. A very steep transient pulse or wavefront is generated by the light sensor whenever either edge of the corner angle of the pattern is parallel to the slit. A digital processor is responsive to the steep transient pulses and the angle marks for detecting the angular difference, during one revolution of the image, between consecutive appearances of two steep transient pulses.

16 Claims, 12 Drawing Figures

OPTICAL ANGLE MEASURING SYSTEM

BACKGROUND OF THE INVENTION

1. Field of the Invention

This invention relates to apparatus for measuring angles and particularly to an electro-optical system for automatically measuring corner angles of graphic patterns.

2. Description of the Prior Art

In many military and commercial applications there is a requirement for measuring the corner angles of graphic patterns or images. Typically, this requirement exists in the analysis of explosive shock-wavefronts, nuclear emulsion tracks, topographic measurements, geodesic surveys and in any other application in which repetitive angle measurements have to be made. One example in the field of explosives lies in the analysis of the shock-wavefront of an exploding shaped charge. In this case it is desirable to know the angle of streaks in the explosion pattern in order to determine the velocity of the shock front as the charge explodes. Another example lies in the field of nuclear research wherein, for example, nuclear emulsion tracks must be analyzed. More specifically, for example, an accelerated particle which collides with a resting particle will form a branching track and the angle between the tracks will provide information on velocity, energy content, the nature of the particles (a neutron, an alpha particle, etc.), and what happened in the interaction between the nuclear particles.

In the fields of explosives and nuclear research, as well as in other applications, hundreds and even thousands of photographs may be taken and analyzed to determine the above information from the corner angles of the graphic patterns in the photographs or charts, etc. The usual technique employed in analyzing these graphic patterns consists of manually applying a special type of protractor and reading the scale on the protractor to obtain the measured value in degrees. This type of protractor is called a curvimeter or derivimeter and is manufactured by, for example, the A. Ott Company of Kempten, Bavaria, Germany. The utilization of a curvimeter or derivimeter requires a skilled operator to perform manual, tedious and time-consuming measurements to ascertain the desired corner angles. Furthermore, even a skilled operator is prone to error and subject to fatigue after analyzing a large number of graphic patterns over a sustained period of time.

SUMMARY OF THE INVENTION

Briefly, applicant has provided an optical system for automatically measuring the corner angle of a graphic pattern whereby in a preferred embodiment the image of the graphic pattern is illuminated, rotated by a rotating K-mirror assembly and focussed by a lens onto an orthogonally-positioned, rotating mirror drum, which scans the rotationally aligned image through a slit into a photomultiplier circuit, which in turn generates a steep transient pulse whenever either edge of the corner angle of the pattern is parallel to the slit. A digital processor is responsive to these steep transient pulses and to angle marks developed by an angle mark generator for detecting the desired angular difference between two consecutive steep transient pulses.

It is therefore an object of this invention to provide an improved apparatus for the measurement of corner angles of graphic patterns.

Another object of this invention is to provide an optical system for automatically measuring the corner angle of a graphic pattern.

Another object of this invention is to provide a faster, more accurate and more consistent system for measuring corner angles of graphic patterns than any other presently known system or device.

Another object of this invention is to provide an optical system for performing an angle measurement on a graphic pattern placed within the periphery of an aperture, regardless of the angular orientation or position of the pattern within the aperture.

A further object of this invention is to provide a relatively simple, easy-to-operate system for measuring corner angles of graphic patterns.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views wherein.

DESCRIPTION OF THE PREFERRED EMBODIMENT

Figures 1, 2:
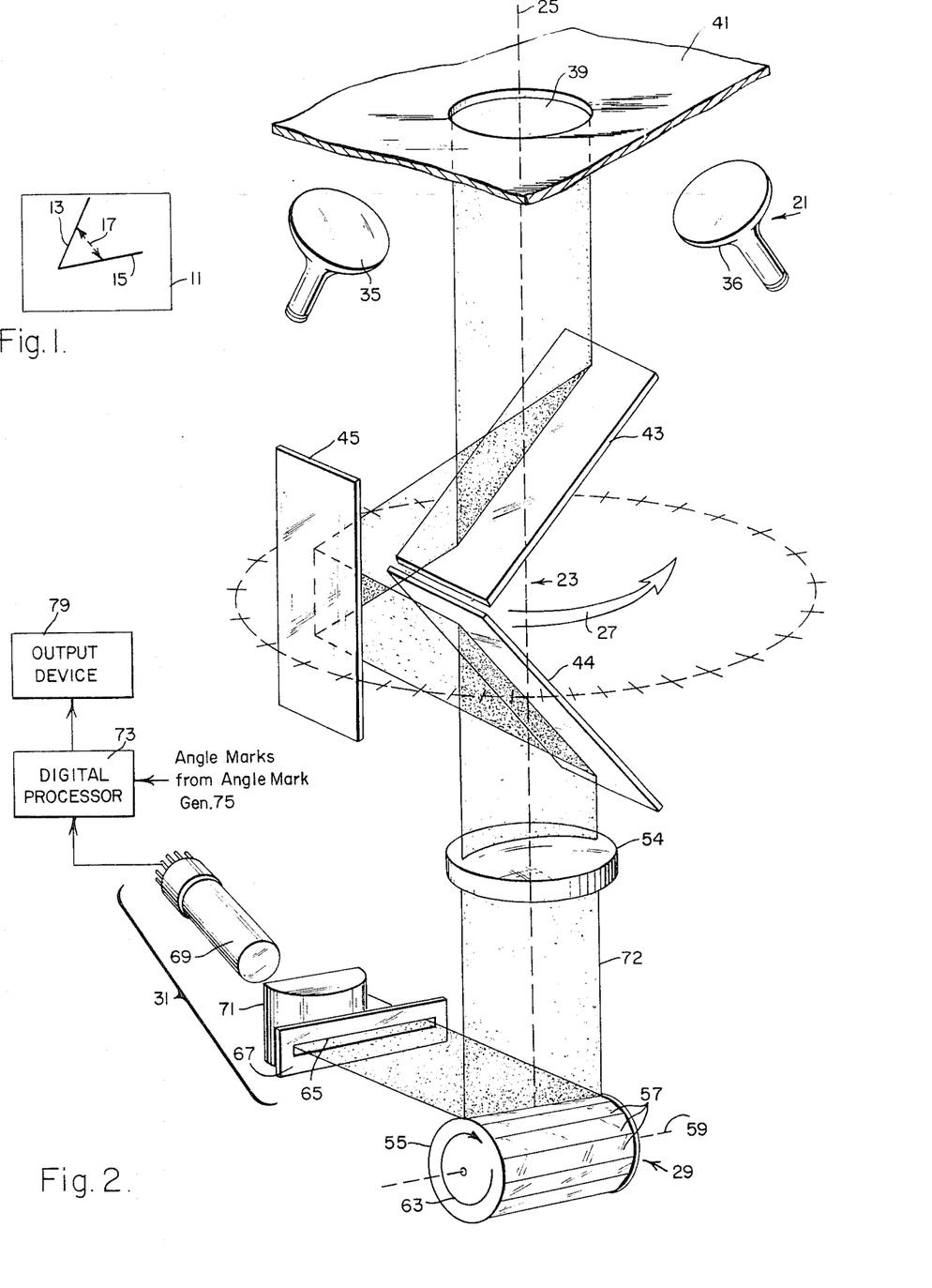
FIG. 1 illustrates a typical angle formed by nuclear emulsion tracks of a graphic pattern that is to be analyzed.
FIG. 2 is an isometric schematic diagram illustrating an optical angle measuring system in accordance with a preferred embodiment of this invention.

Referring now to the drawings, FIG. 1 illustrates a photograph 11 in which the intersection of two opaque edges or lines 13 and 15 of a graphic pattern produces an exemplary corner angle 17, of for example, nuclear emulsion tracks, of less than 180° and designated by dashed lines, with the remaining portion of the photograph 11 being, for example, clear or light reflective. The measurement of the corner angle 17 will provide information on the velocity, energy content and nature of the colliding particles, as well as what happened in the interaction between the colliding nuclear particles.

Figure 3:
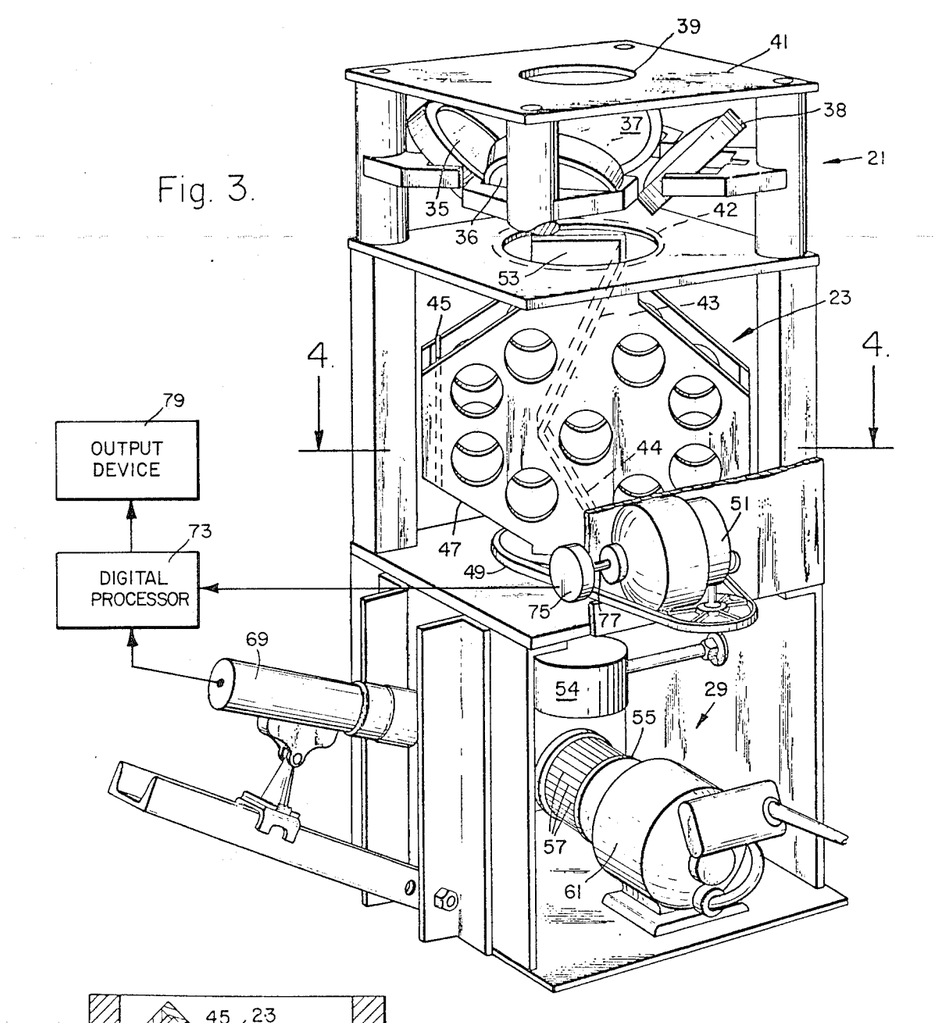
FIG. 3 pictorially shows the relative placement of some of the components of the preferred embodiment of this invention that is illustrated in FIG. 2.
Figure 4:
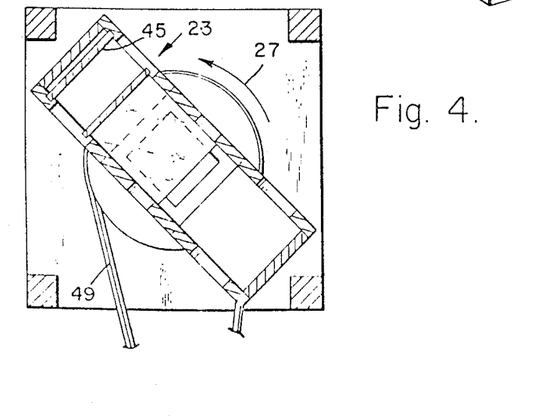
FIG. 4 illustrates a cross-sectional view along the line 4—4 of FIG. 3.

FIGS. 2, 3 and 4 disclose a preferred embodiment of an optical angle measuring system in accordance with the invention for automatically measuring this corner angle 17. More specifically, FIG. 2 illustrates an isometric schematic diagram of the preferred embodiment, FIG. 3 illustrates in more detail the electromechanical components and their relative placement in relation to the preferred embodiment, and FIG. 4 illustrates a cross-sectional view along the line 4—4 of FIG. 3.

Figure 4A:
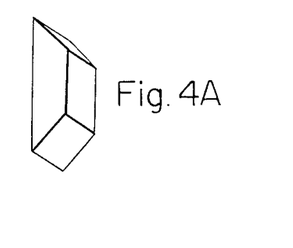
FIG. 4A illustrates a reflecting prism which may be used in place of the mirror complex shown in the preferred embodiment of FIGS. 2, 3 and 4.

FIG. 4A illustrates a reflecting prism which may be used in place of the mirror complex shown in the preferred embodiment of FIGS. 2, 3 and 4. For a better understanding of the preferred embodiment of this invention, FIGS. 2, 3 and 4 of the drawings will now be jointly discussed.

The major components of the preferred embodiment of this optical angle measuring system include: an illuminating source assembly 21 for illuminating the graphic pattern whose corner angle is to be measured; beam rotator optics 23 for rotating reflected light images of the graphic pattern about an optical axis 25 in a direction such as indicated by the arrow 27; beam scanner optics 29 for causing sequences of incremental portions of the reflected light images of the graphic pattern to be scanned in a direction transverse to the relative position of the corresponding sequences of incremental portions on the graphic pattern to be analyzed; light sensitive means 31 for detecting the edges 13 and 15 of the corner angle 17 that lie between the opaque and clear portions of the pattern; and angle mark generator 75 for generating angle marks as the beam rotator optics 23 rotates; a digital processor 73 responsive to the angle marks and the detected edges of the corner angle for generating angle information; and an output device 79 for indicating the desired angle.

The illuminating source 21, which may consist of a source of light or other radiant energy, is shown for example, being comprised of conventional types of lamps 35 through 38 (FIG. 3). The lamps 35 through 38 are situated adjacent to a target area or aperture 39 in order to illuminate a graphic pattern, such as that illustrated in FIG. 1, which is placed on or in close proximity to a surface 41 and within the periphery of the aperture 39 for the purpose of being measured.

The reflected light image of the illuminated graphic pattern is applied to the beam rotator optics 23. The beam rotator optics 23 may include, for example, a reflecting prism as shown in FIG. 4A, characterized by the quality of totally internally reflecting incident light rays an odd number of times prior to emergence therefrom. Such a reflecting prism may be a Dove or Pechan prism, both of which are described in the McGraw-Hill Encyclopedia of Science and Technology, McGraw-Hill Book Co., Inc., 1960, Vol. 8, page 508. As an alternative to a reflecting prism, a mirror complex constructed to simulate the characteristics of the aforesaid prism may be employed in the beam rotator optics 23. The use of such a mirror complex is particularly suitable in cases where a large prism would be required but the use of a prism would be impractical due to the prism weight and the difficulty in obtaining a flawless prism. A mirror complex, such as described above, is utilized in the preferred embodiment of this invention depicted in FIGS. 2, 3 and 4. In these figures the beam rotator optics 23 includes three reflecting elements such as first surface mirrors 43, 44 and 45 having planar reflecting surfaces. The mirrors 43 through 45 are oriented relative to each other in a K-shaped mechanical configuration wherein the mirrors 43 and 44 are aligned in end-to-end generally angular adjacency with the planar reflecting surfaces oriented in a plane with one axis orthogonal to the optical axis. The optical axis 25 of the beam rotator optics 23 (FIG. 2) extends through points in the mirros 43 and 44, respectively, which points are preferably equidistant from the respective edges of the mirrors 43 and 44. Mirror 45 is situated parallel to the axis 25 and positioned at a distance from the apex of mirros 43 and 44 symmetrically therewith. Each of the mirrors 43, 44 and 45 may be suitably mounted and retained in an appropriate housing 47 (FIG. 3) adapted to be rotated about a mechanical axis, which in this case is the optical axis 25, for example, by a pulley 49 driven by a suitable motor 51. The housing 47 can include two openings, respectively located at an upper end 53 (FIG. 3) and a lower end (not shown). The reflected light images of the graphic pattern in the aperture 39 pass into the opening in the upper end 53, and then are sequentially reflected from mirror 43 to mirror 45 to mirror 44 before exiting from the opening in the lower end of the housing 47. An exemplary angle usable between the mirrors 43 and 44 would be 120°; however, this angle may be varied as is practical and desirable to modify the physical configuration of the K-mirror complex.

Characteristically, reflected light images entering the opening in the upper end 53 of the housing 47 will be optically rotated about the optical axis 25 by the beam rotator optics 23 through an optical angle twice the mechanical rotation angle of the beam rotator optics 23. For example, if the beam rotator optics 23 is rotated 45°, images entering the upper end 53 of the housing 47 will be rotated 90° upon emerging from the lower end (not shown) of the housing 47. It is therefore apparent that the rotation of the beam rotator optics 23 about its mechanical axis, which is coaxial with the optical axis 25, will cause the reflected light image from the graphic pattern, upon passage through the reflecting mirror complex retained in the housing 47, to be angularly rotated about a center point by means of the pulley 49 driven by the motor 51.

It is the rotation of the reflected light image of the graphic pattern about the axis 25 which allows the optical angle measuring system to measure the corner angle of the graphic pattern placed within the periphery of the aperture 39, regardless of the angular orientation or position of the pattern within the aperture.

The rotating reflected light image of the graphic pattern may be focussed by a lens 54 before it is received by the beam scanner optics 29. The beam scanner optics 29 may include, for example, a mirror drum 55 with a polygonal periphery having affixed thereto a plurality of flat reflecting elements such as first surface rectangular mirrors 57 which are uniformly secured in juxtaposed relationship, each mirror 57 extending the full length of the drum 55 so as to provide a polygonal reflecting surface or facet on the circumference of the drum 55. The drum 55 is rotated about its longitudinal axis 59 by a suitable motor 61 (FIG. 3) in a direction indicated by the arrow 63. Assume, for illustrative purposes, that there are 32 mirrors or facets 57 on the mirror drum 55, that the mirror drum 55 is rotated at a rate of 1,800 rpm (revolutions per minute) or 30 rps (revolutions per second), and that the beam rotator optics 23 is rotated at a rate of 60 rpm. Since the rotating image emerging from the beam rotator optics 23 will rotate at twice the physical rate of rotation of the beam rotator optics 23, or 120 rpm, the rotating image will make two revolutions every second (2 rps). Furthermore, since the mirror drum 55 has 32 facets and rotates at 30 rps, it passes 960 images every second in front of an elongated, rectangular-shaped slit 65 of an opaque mask 67. Thus, for every revolution of the image, 480 images will pass in front of the slit 65, or the entire graphic pattern of FIG. 1 will be completely scanned during each angular increment of ¾° of rotation of the beam rotator optics 23. It should be noted that the images will pass the slit 65 at twice the physical rate of rotation of the mirror drum 55, thereby resulting in a doubling of the signal frequency subsequently detected. It should also be noted that greater or less angular increments than ¾° may be chosen by changing the speed of rotation of the beam rotator optics 23 and/or the mirror drum 55. However, if it is desired to maintain the angular increment at ¾°, any change in the speed of, for example, the beam rotator optics 23 must be accompanied by a proportionate change in the speed of the mirror drum 55. For example, if the speed of the beam rotator optics 23 is doubled, the speed of the mirror drum 55 must be doubled in order to maintain the angular increment at ¾° about the axis 25. It is advisable to keep the angular increment as small as practically possible to increase the accuracy of the corner angle measurement.

The pattern of a reflected image, received from the beam rotator optics 23 via the lens 54 is scanned by each mirror 57 on the mirror drum 55 through the elongated, rectangular-shaped slit 65 of the opaque mask 67 onto a suitable photomultiplier 69, which is part of the light sensitive means 31. The distance from the slit 65 to that line on the mirror drum 55, from which the reflected image is projected in focus to the slit 65, is determined by the location and focal length of the lens 54. The length of the slit 65 is determined by the diameter of the aperture 39 as focussed on the slit 65 by the lens 54, while the width of the slit 65 determines the preselected size of the incremental portion of a reflected light image that is to be passed through the slit 65 at any given time. Suitable aspherical focussing means, such as a lens 71, can be inserted between the slit 65 and the photomultiplier 69 to concentrate the light passing through the slit 65. The light sensitive means 31 may be comprised of the mask 67, the photomultiplier 69 and the focussing means 71. It should be noted at this time that a reflected light path 72 for one predetermined incremental portion of a graphic pattern in FIG. 2 is shown as it passes through the beam rotator optics 23, the lens 54, and as it is scanned by the rotating mirror drum 55 into the slit 65. The photomultiplier 69 converts the light energy impinging thereon into electrical signals which are then applied to a digital processor 73. Also applied to the digital processor are angle marks from an angle mark generator 75 which is coupled to the shaft 77 of the motor 51.

The generator 75 may be selected to generate one angle mark for each one-tenth of a degree of rotation, or 3,600 angle marks per revolution of the beam rotator optics 23. If it is desired, a suitable gear arrangement may be utilized between the generator 75 and the shaft 77 to generate more or less than 3,600 angle marks per revolution of the beam rotator optics 23.

To derive the 3,600 angle marks per revolution, for example, the circumference of a rotary section (not shown), inside the angle mark generator 75, may have a digitizer 76 (FIG. 5) mounted on it for generating the pulses and coupled to the shaft 77, with the digitizer 76 having 3,600 magnetic spots positioned at equal intervals around its circumference. The angular increment between any two adjacent magnetic spots is therefore one-tenth of a degree. Each time that one of the 3,600 magnetic spots rotates past, for example, a pickup coil 78 of a read amplifier 80 (FIG. 5) mounted on a stationary section (not shown) of the angle mark generator 75, a voltage pulse is generated. With each complete revolution of the rotary section past the pickup coil 78 of the read amplifier 80, a serial stream of 3,600 angle mark pulses is therefore generated.

In response to the detected electrical signals from the photomultiplier 69 and to the angle marks from the generator 75 the digital processor 73 selects only the edges of the corner angle and counts the angle marks therebetween in order to generate the desired angle information. This angle information from the digital processor may then be applied for visual observation and/or retention to an output device 79, which may be a display unit, a printer or a memory unit.

Figure 5:
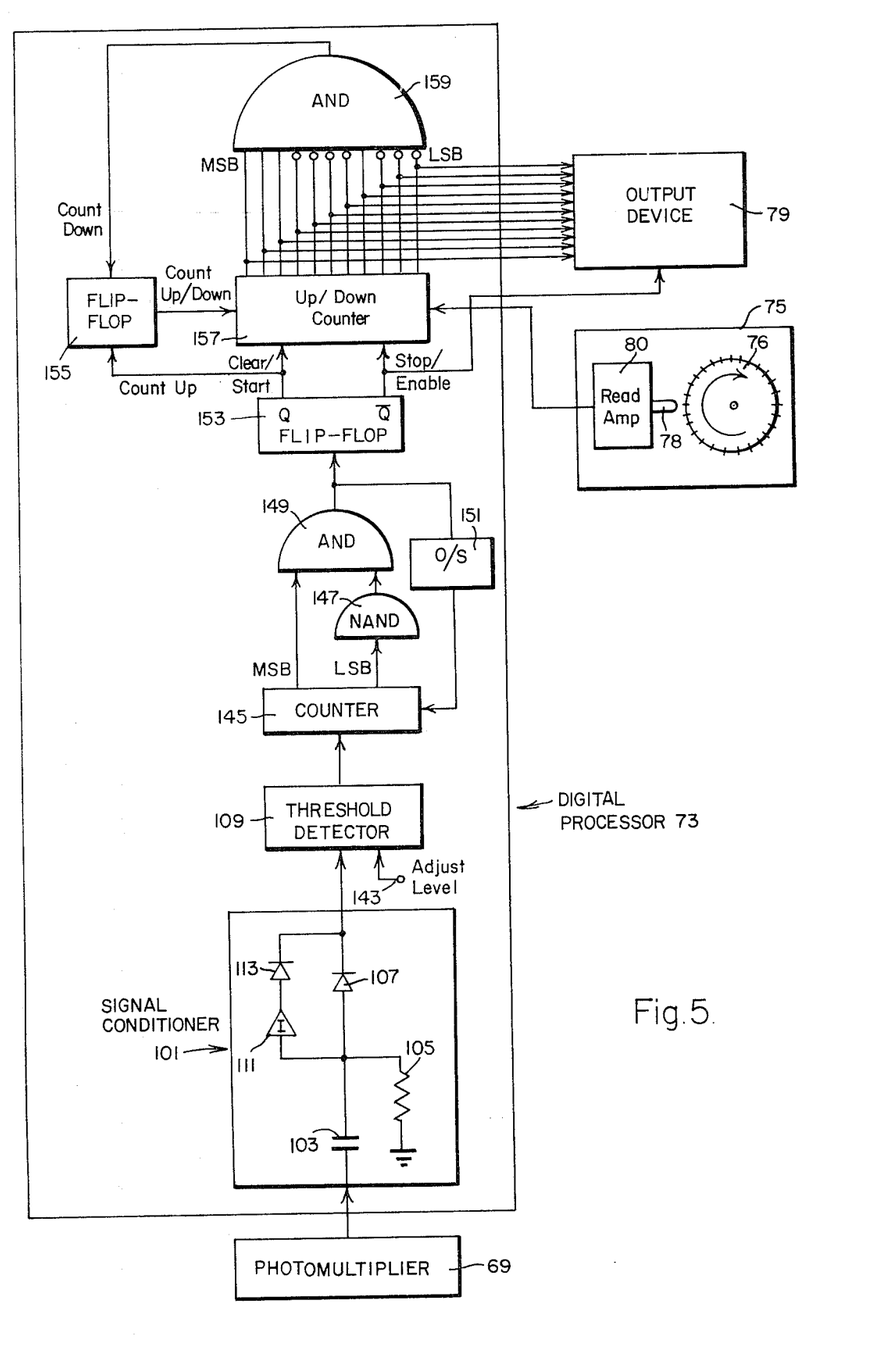
FIG. 5 illustrates a schematic block diagram of the digital processor 73 of FIG. 2.

Referring now more specifically to FIG. 5 the digital processor 73 will now be more fully discussed. The detected electrical signals from the photomultiplier 69 are applied to a signal conditioner 101, which passes only signals having a large rate of change or high frequency, regardless of their polarity. The signals from the photomultiplier 69 are differentiated by a differentiating circuit composed of a capacitor 103 serially coupled to a resistor 105. A differentiated pulse having a positive polarity is passed through a diode 107 to a threshold detector 109, while a differentiated pulse having a negative polarity is inverted by an inverter 111 before being passed through a diode 113 to the threshold detector 109. By this operation the signal conditioner 101 basically passes at a single polarity only the high frequency components of the outputs of the photomultiplier 69. To illustrate this operation, reference will now be made to FIGS. 6A, 6B and 6C.

Figure 6A:
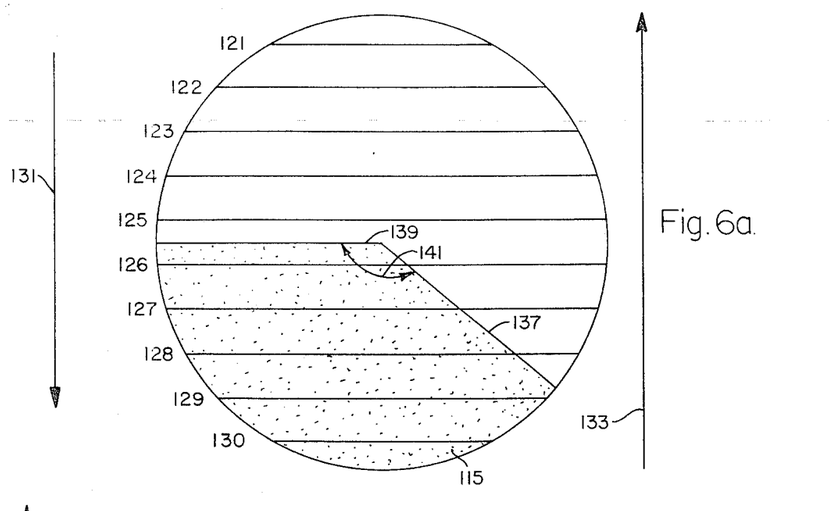
FIGS. 6A, 6B, 6C, 7A, 7B, 8A and 8B illustrate orientations of graphic patterns of shock-wavefronts of exploding shaped charges and corresponding outputs of the photomultiplier 69 in order to better explain the operation of the invention.
Figure 6B:
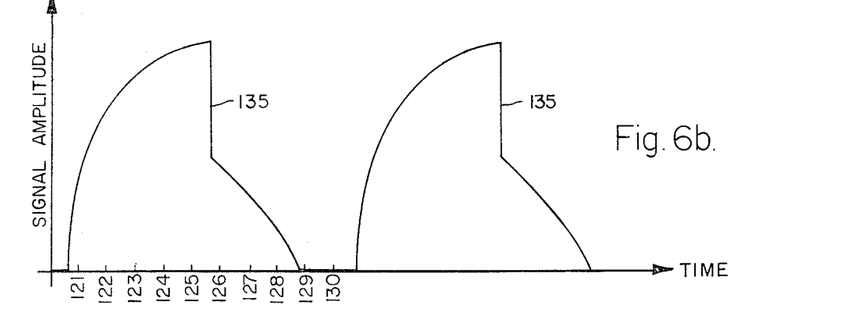
Figure 6C:
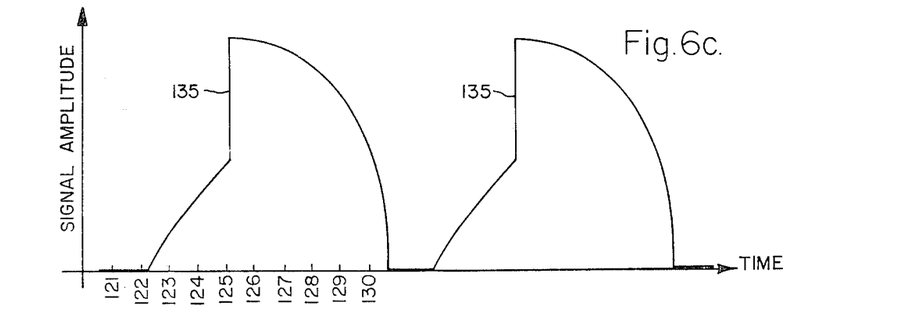

The waveform in FIG. 6A (as well as the waveforms in FIGS. 7A and 8A) illustrates the shock-wavefront of an exploding shaped charge. When the shaded or opaque portion 115 and the rest of the graphic pattern of FIG. 6A is horizontally scanned in the system by, for example, the horizontal lines 121 through 130 in the direction indicated by the arrow 131, by the consecutive single scans of two adjacent mirrors 57 on the mirror drum 55 the signal waveforms shown in FIG. 6B are developed by the photomultiplier 69. In a like manner, a reversal of the scan in the direction indicated by the arrow 133 produces a mirror image of the signal waveform of FIG. 6B, as shown in FIG. 6C. It should be noted that both the signal waveforms of FIGS. 6B and 6C contain a very steep transient wavefront 135 which is generated whenever either of the edges 137 or 139 of the corner angle 141 of FIG. 6A is parallel to the slit 65. In other words, the rotation of the reflected light image of the illuminated graphic pattern of FIG. 6A by the beam rotator optics 23 will cause the photomultiplier 69 to develop a very steep transient wavefront 135 when the edge 137 of the corner angle 141 is parallel to the slit. In a similar manner, when the beam rotator optics 23 has caused the reflection of the edge 139 to be rotated through the corner angle 141, the edge 139 will be parallel to the slit 65 and the photomultiplier 69 will again generate a very steep transient wavefront 135.

The signal conditioner 101 will readily pass these steep transient wavefronts 135 and will attenuate all other outputs of the photomultiplier 69. The level of the threshold detector 109 may be either manually or automatically adjusted by an adjust level control 143 to block the attenuated outputs of the photomultiplier 69 and only pass the steep transient wavefronts 135 representing the edges 137 and 139 of the corner angle 141 shown in FIG. 6A.

As the slowly rotating beam rotator optics 23 causes either of the edges 137 and 139 of the corner angle 141 to be rotated into and away from a parallel alignment with the slit 65, more than one step transient wavefront 135 will be generated at the output of the photomultiplier 69 as the beam rotator optics slowly rotates. Without any discrimination among this plurality of wavefronts 135 for each of the edges 137 and 139, a highly erroneous angle count could be developed by the system. In order to provide the necessary discrimination among this plurality of wavefronts 135 for the initiation and termination of an angle count, it is necessary to select unique pulses for the activation and termination of this angle count. Several possible ways exist to perform this function. The simplest way will now be discussed.

The rotation rate of the beam rotator optics 23 and the rotation rate of the mirror drum 55 may be adjusted so that the rate ratio therebetween is such that no less than two nor more than four pulses or wavefronts 135 are generated during the rotation of a straight line edge of a corner angle past the slit 65. The ratio of the scan is given by the contrast of the width of the slit 65 and, in case of thin lines, the width of the line. As a result there is a minimum of two and a maximum of four pulses resulting from the plurality of wavefronts 135 being applied to the signal conditioner 101, which will be detected by the threshold detector 109 for each edge of a corner angle to be measured. This maximum of four pulses is applied to a two-bit counter 145, which has its output least significant bit (LSB) coupled through a NAND gate 147 to one input of an AND gate 149, while its output most significant bit (MSB) is coupled directly to a second input of the AND gate 149. The first two pulses from the maximum of four pulses cause the counter 145 to increment up to a digital count of two (10). At this time the AND gate 149 is enabled to develop a binary 1 state output which triggers a one-shot (O/S) multivibrator 151 to develop a signal which resets the counter 145 and disables the counter 145 for a period of time greater than tiwce the period of time between adjacent pulses. By this means the counter 145 is indirectly disabled by the second pulse and not enabled to count pulses again until after the fourth pulse has been generated. The counter 145 will then not start counting again until the application of the pulses related to the remaining edge of the corner angle. As a result, the AND gate 149 will only respectively develop first and second control pulses for the edges 137 and 139 of the corner angle 141 to be measured.

Assume that a control pulse is developed for the edge 137 before the one is developed for the edge 139. The control pulse representing the edge 137 will then trigger a flip-flop 153 to cause its Q and Q̄ output sides to change to binary 1 and 0 states, respectively. The binary 1 state from the Q output of the flip-flop 153 causes a flip-flop 155 to develop and apply a count up signal to an up-down counter 157, and at the same time, causes the counter 157 to clear or reset its count to zero and start counting angle marks from the read amplifier 80 of the generator 75. The generation of the control pulse representing the edge 139 causes the Q and Q̄ output sides of the flip-flop 153 to change to binary 0 and 1 states, respectively. The binary 1 state from the Q̄ side of the flip-flop 153 causes the counter 157 to stop counting angle marks and enables the output device 79 to receive from the counter 157 the binary count representing the measured corner angle. As specified before, the output device 79 may be a display unit for visually displaying the angle, or a printer or a memory unit for retaining the corner angle information.

Assume that a control pulse is developed for the edge 139 before one is developed for the edge 137. In this case angle marks from the generator 75 are allowed to be counted by the counter 157 over an angle equal to 360° minus the desired corner angle 141 in FIG. 6A. To prevent an error in the measurement of the desired corner angle 141, an AND gate 159 is coupled to the counter 157 and is mechanized to develop a binary 1 state output when the counter 157 reaches a binary count representing an angle of 180°. For example, if 3,600 angle marks are generated by the generator 75 for each revolution of the beam rotator optics 23, a digital count of 11100001000 would represent 1,800 angle marks or an angle of 180°. As a result, the counter 157 has to be only 11 bits wide. The AND gate 159 is therefore such that, when the first, second and third most significant bits (MSBs) and the fourth least significant bit of the output of the counter 159 are all in binary 1 states and all other bits therefrom are in binary 0 states, the AND gate 159 develops a binary 1 state output which triggers the flip-flop 155 to develop and apply a count-down signal to the counter 157. As a consequence, the counter 157 starts counting angle marks when the first control pulse is developed from the edge 139, continues counting up until an angle representative of 180° is reached, and then counts down until the second control pulse is developed from the edge 137, at which time the counter 157 stops counting and the output device 79 is enabled to receive the correct angle information for the angle 141. For example, assume that the angle 141 is equal to 117°. Then after the first control pulse, which was developed from the edge 139, starts the counter 157, the counter 157 counts up until a count corresponding to an 180° angle is reached, and from that instant the counter 157 starts counting down until the second control pulse is developed from the edge 137. Since the graphic pattern of FIG. 6A is now rotated such that consecutive control pulses bracket an angle equal to 360° minus 117° or 243°, the counter 157 counts up to 180° and then counts down for 63°, leaving a resultant count representative of the correct angle of 117°.

In the event that the angle to be measured is exactly 180°, the counter 157 would count up until a count corresponding to an 180° angle is reached, at which time the count of the counter 157 is stopped by the second control pulse and the 180° angle information is received by the output device 79.

Figure 7A:
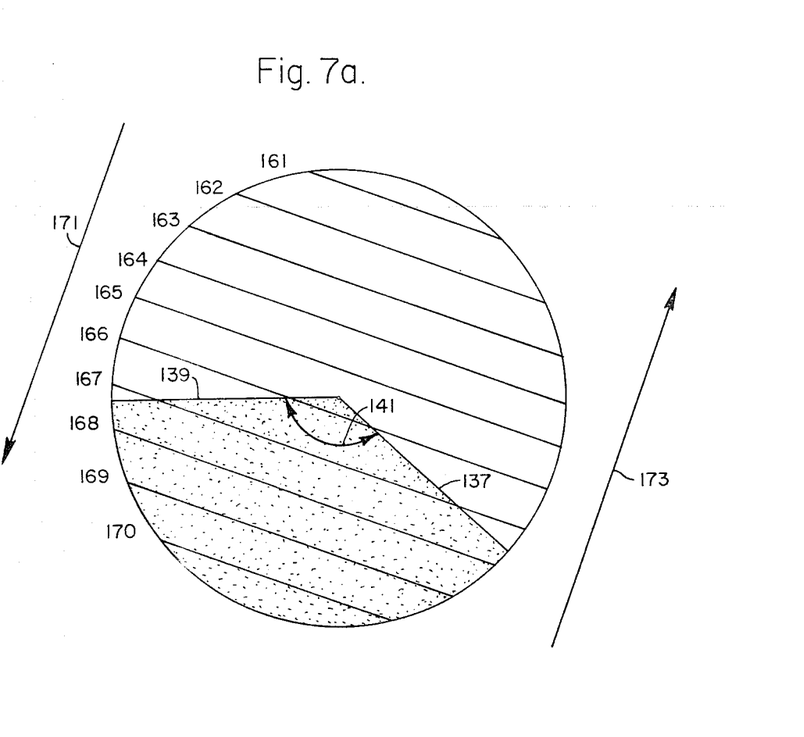
Figure 7B:
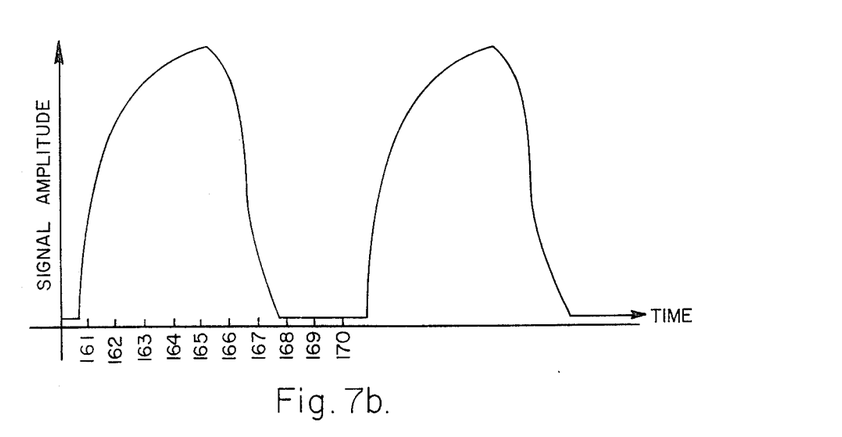

FIG. 7A discloses the graphic pattern of FIG. 6A being scanned in the system by, for example, the horizontal lines 161 through 170 in the direction indicated by the arrow 171. Since neither of the edges 137 and 139 is parallel to the slit 65 in the scanning orientation of FIG. 7A, the photomultiplier 69 develops the signal waveform shown in FIG. 7B. This signal waveform of FIG. 7B will not cause the threshold detector 109 to develop an output since no steep transient is developed in the waveform of FIG. 7B. When the graphic pattern of FIG. 7A is scanned in a direction indicated by the arrow 173, a mirror image (not shown) of the signal waveform of FIG. 7B is generated.

Figure 8A:
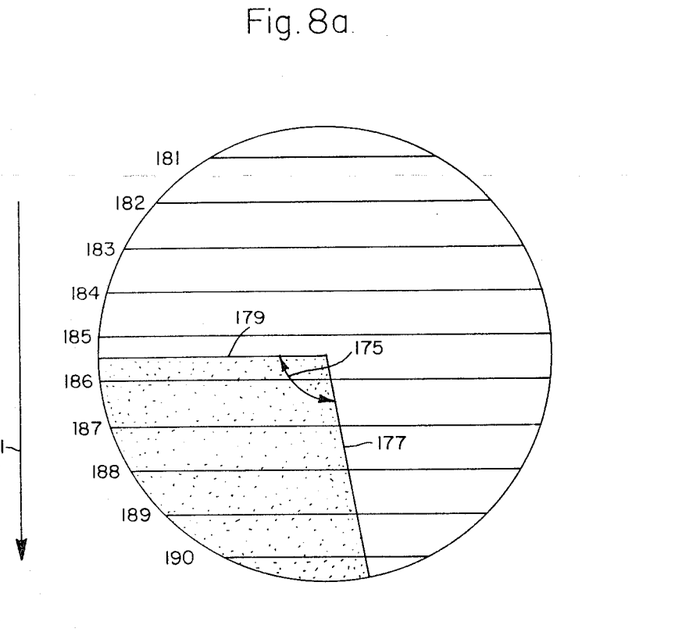
Figure 8B:
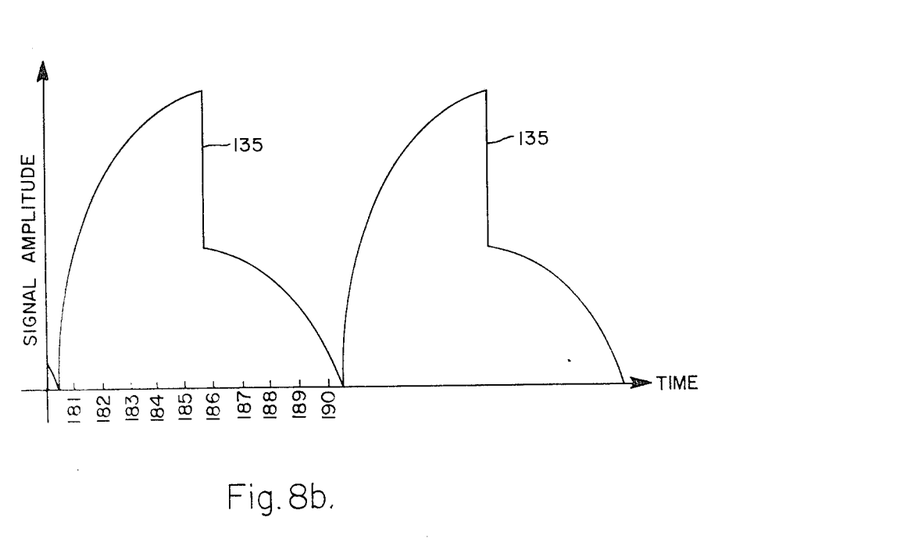

FIG. 8A illustrates a graphic pattern of a smaller angle 175 included between two edges 177 and 179. When the graphic pattern of FIG. 8A is scanned in the system by, for example, the horizontal lines 181 through 190 in the direction indicated by the arrow 191, the photomultiplier 69 develops the signal waveform shown in FIG. 8B. It should be noted that the waveform of FIG. 8B contains a very steep wavefront 135 in the same manner previously described.

The above mechanization for initiating and terminating the angle count for the desired angle measurement has been described for illustrative purposes. The illustrated mechanization, when utilized with the rotational rates and pulse numbers previously cited, would introduce a maximum error of 1 ½°, since the third and fourth additional pulses applied from the threshold detector 109, after a control pulse is generated, have to be multiplied by the incremental angle (¾°) passed during each of these two pulses.

Alternate methods to initiate the angle counting sequence and to accumulate the necessary angle count are more sophisticated and require the detection of the amplitude of the pulses emerging from the photomultiplier. In this case, the signal conditioner 101 will not correct the amplitude of these pulses but rather, amplify them and process them in such a way that single polarity pulses of varying amplitude emerge from the signal conditioner. These pulses of differing amplitudes are now processed in the following manner.

As one edge of a corner angle to be measured approaches a parallel alignment with the slit 65 a sequence of pulses of increasing amplitude, generated by the photomultiplier 69, passes a special discriminating circuit, such as a peak detector, without activating the angle count. After that edge of the corner angle reaches and passes a parallel alignment with the slit 65, a sequence of pulses of decreasing amplitude is generated by the photomultiplier 69. A predetermined one of the sequence of pulses of decreasing amplitude, such as the first or second pulse after the peak pulse is generated, is sufficient to cause the peak detector to initiate the angle count. A corresponding predetermined pulse for the second edge of the corner angle will then terminate the angle count. This procedure has the advantage that it is truly independent of the statistical fluctuations which occur between the scan and the orientation of either edge of a corner angle so that in the case of two sequential scans straddling the optimum possible alignment of an edge without the slit 65, the next scan will still automatically initiate (or terminate) the angle count.

It should be noted at this time that the angle measurement of the graphic pattern of FIG. 1 would be made in a manner similar to those described in relation to FIGS. 6A, 7A and 8A, with a very steep transient signal, similar to the wavefront 135, being developed at the output of the photomultiplier 69 when either of the edges 13 and 15 is in a parallel alignment with the slit 65.

The invention thus provides an optical system for automatically measuring corner angles of graphic patterns wherein the graphic pattern is illuminated by a light source and the resultant reflected image of the graphic pattern is slowly rotated by a K-mirror assembly and rapidly scanned by a rotating mirror drum past a slit into a detector. In response to the output of the detector and to angle marks from an angle mark generator, a digital processor accumulates the incremental angle count to measure the corner angle of the graphic pattern. Information on the measured corner angle may then be supplied to an output device for viewing or retention of the desired corner angle.

While the salient features of the invention have been illustrated and described it should be readily apparent to those skilled in the art that modifications can be made within the spirit and scope of the invention as set forth in the appended claims.

What is claimed is:

1. An optical system for measuring a corner angle of a graphic pattern, said system having an optical axis and comprising:
   first means for causing light images of the graphic pattern to be developed;
   second means situated along the optical axis for rotating the light images of the graphic pattern about the optical axis;
   third means for repeatedly scanning sequences of incremental portions of each of the light images of the graphic pattern;
   fourth means responsive to the sequences of incremental portions being scanned by said third means for detecting first and second edges of the corner angle of each of the light images of the graphic pattern;
   fifth means coupled to said second means for generating angle marks; and
   sixth means, coupled to said fourth and fifth means, being responsive to the detected first and second edges and the angle marks for generating an output signal corresponding to the corner angle to be measured.

2. The system of claim 1 wherein said second means comprises:
   a reflecting prism having the quality of internally reflecting the light images an odd number of times prior to emergence therefrom, said prism being axially aligned on the optical axis; and
   seventh means for rotating said prism about the optical axis.

3. The system of claim 1 wherein said second means comprises:
   first reflector means situated along the optical axis at a first angle thereto for reflecting the light images of the graphic pattern in a first direction;
   second reflector means situated parallel to the optical axis for reflecting the light images reflected from said first reflector means in a second direction;
   third reflector means situated along the optical axis at a second angle thereto for reflecting the light images reflected from said second reflector means in a third direction;
   housing means for retaining said first, second and third reflector means in fixed positions relative to each other; and
   seventh means for rotating said housing means about the optical axis.

4. The system of claim 1 wherein said third means comprises:

a drum-shaped member having an external periphery, said member being rotated about its longitudinal axis at a faster rate than the light images of the graphic pattern are rotated around the optical axis by said second means; and a plurality of reflecting means selectively mounted on the external periphery of said drum-shaped member for sequentially reflecting incremental portions of each of the rotating light images of the graphic pattern into said fourth means.

5. The system of claim 1 wherein said fourth means comprises:

an opaque mask having an aperture of a preselected configuration through which said third means scans the rotated light image; and a photomultiplier positioned adjacent to said opaque mask for detecting the first and second edges of each of the light images of the corner angle passing through the aperture of said mask.

6. The system of claim 5 further including a lens positioned between said mask and said photomultiplier for focussing the scanned light images passing therebetween.

7. The system of claim 1 wherein said fifth means comprises an angle mark generator.

8. The system of claim 1 further including seventh means coupled to said sixth means for indicating the corner angle of the graphic pattern.

9. The system of claim 1 wherein said sixth means comprises:

eighth means coupled to said fourth means for developing first and second signals representative of the detected first and second edges respectively of the corner angle of the graphic pattern;

ninth means coupled to said fifth means for counting the angle marks therefrom; and tenth means coupled to said eighth and ninth means for allowing said ninth means to start counting angle marks in response to one of the first and second signals and for stopping the angle mark count of said ninth means in response to the other one of the first and second signals in order to develop the output signal corresponding to the corner angle to be measured.

10. The system of claim 9 further including eleventh means for enabling said ninth means to count up to the output signal corresponding to the corner angle to be measured when said eighth means develops the first signal before the second signal, and for enabling said ninth means to count up to a signal corresponding to an angle equal to 180° and then to count down to the output signal whenever said eight means develops the second signal before the first signal.

11. The system of claim 9 wherein said fifth means comprises an angle mark generator coupled to said ninth means for supplying angle marks thereto in response to the rotation of the light image by said second means.

12. The system of claim 11 wherein said fourth means comprises:

an opaque mask having an aperture of a preselected configuration through which said third means scans each of the rotated light images; and a photomultiplier coupled to said eighth means and positioned adjacent to said opaque mask for supplying to said eighth means detected signals related to the first and second edges of the light images of the corner angle passing through the aperture of said mask.

13. The system of claim 12 further including a lens positioned between said mask and said photomultiplier for focussing the scanned light images passing therebetween.

14. The system of claim 12 wherein said third means comprises:

a drum-shaped member having an external periphery, said member being rotated about its longitudinal axis at a faster rate than the light images of the graphic pattern are rotated around the optical axis by said second means; and a plurality of reflecting means selectively mounted on the external periphery of said drum-shaped member for sequentially reflecting incremental portions of each of the rotating light images of the graphic pattern into said fourth means.

15. The system of claim 14 wherein said second means comprises:

a reflecting prism having the quality of internally reflecting the light images an odd number of times prior to emergence therefrom, said prism being axially aligned on the optical axis; and seventh means for rotating said prism about the optical axis.

16. The system of claim 14 wherein said second means comprises:

first reflector means situated along the optical axis at a first angle thereto for reflecting the light images of the graphic pattern in a first direction;

second reflector means situated parallel to the optical axis for reflecting the light images reflected from said first reflector means in a second direction;

third reflector means situated along the optical axis at a second angle thereto for reflecting the light images reflected from said second reflector means in a third direction;

housing means for retaining said first, second and third reflector means in fixed positions relative to each other; and seventh means for rotating said housing means about the optical axis.

* * * * *